United States Patent [19]

Kimura et al.

[11] Patent Number: 4,970,116

[45] Date of Patent: Nov. 13, 1990

[54] SUBSTRATES FOR PRESENSITISED PLATES FOR USE IN MAKING LITHOGRAPHIC PRINTING PLATES

[75] Inventors: Takeshi Kimura; Hirokazu Sakaki, both of Shizuoka, Japan

[73] Assignee: Fuji Photo Film Co., Ltd., Minami-Ashigara, Japan

[21] Appl. No.: 280,433

[22] Filed: Dec. 6, 1988

[30] Foreign Application Priority Data

Dec. 7, 1987 [JP] Japan ................................ 62-309295

[51] Int. Cl.[5] ................................ B32B 15/04

[52] U.S. Cl. ................................ 428/332; 428/341; 428/469; 430/278; 430/302

[58] Field of Search ................ 430/278; 428/332, 341, 428/469, 331, 323

[56] References Cited

U.S. PATENT DOCUMENTS

| | | | |
|---|---|---|---|
| Re. 28,506 | 8/1975 | Quaintance et al. | 428/469 X |
| 3,861,917 | 1/1975 | Magnotta et al. | 430/305 |
| 4,123,276 | 10/1978 | Kita et al. | 430/302 X |
| 4,259,434 | 3/1981 | Yamasue et al. | 430/302 |
| 4,554,216 | 11/1985 | Mohr | 428/469 |
| 4,689,272 | 8/1987 | Simon et al. | 428/469 X |

FOREIGN PATENT DOCUMENTS

| | | | |
|---|---|---|---|
| 1069283 | 5/1967 | United Kingdom | 430/305 |
| 1517746 | 7/1978 | United Kingdom | 430/305 |
| 1532235 | 11/1978 | United Kingdom | 430/305 |
| 1587260 | 4/1981 | United Kingdom | 430/305 |
| 2142043A | 1/1985 | United Kingdom | 428/469 |

*Primary Examiner*—Thomas J. Herbert

*Attorney, Agent, or Firm*—Burns, Doane, Swecker & Mathis

[57] ABSTRACT

A substrate for presensitized plates for use in making lithographic printing plates which comprises an alumium plate provided thereon with a porous anodized film, the degree of sealing of the anodized film being not less than 25%. The substrate can impart various excellent properties to the lithographic printing plate as a final product. That is, the plate sparingly causes contamination of the non-image portions thereof; has high resistance to scratching; and is excellent in wear resistance, recovery from contamination with ink and printing durability due to improvement in the properties of the anodized film.

18 Claims, 2 Drawing Sheets

SUBSTRATES FOR PRESENSITISED PLATES FOR USE IN MAKING LITHOGRAPHIC PRINTING PLATES

BACKGROUND OF THE INVENTION

The present invention relates to an aluminum or an aluminum alloy substrate for presensitized plates for use in making lithograhic printing plates (hereunder referred to as simply "PS plate(s)") and more particularly to a substrate for PS plates which sparingly cause contamination of non-image portions of the plate; which have high resistance to scratching thereof; and which are excellent in wear resistance, recovery from contamination with ink and printing durability due to improvement in the properties of the anodized film.

As light-sensitive plates for use in making lithographic printing plates, there have been known so-called PS plates composed of an aluminum plate and a thin film of a light-sensitive composition applied thereon. The aluminum plate is in general subjected to surface treatment such a mechanical technique as brush graining or ball graining; such an electrochemical technique as electrolytic graining; or a combination thereof to roughen the surface thereof, then etched with an aqueous solution of an acid or an alkali, anodized and thereafter optionally subjected to hydrophilization treatment to obtain a substrate for PS plates. Such a PS plate can be prepared by applying a light-sensitive layer thereto. The resultant PS plate is usually imagewise exposed to light, developed, retouched and gummed up to obtain lithographic printing plates which are then placed on a printing machine to perform printing operation.

However, non-image areas of a lithographic printing plate, which is produced by imagewise exposing a PS plate composed of a conventional substrate provided thereon with a positive-working light-sensitive layer and then developing the same, irreversively adsorb the substances present in the light-sensitive layer to cause contamination thereof which makes the differentiation .between the image areas and the non-image areas difficult during a retouching process and which leads to the formation of non-uniform plate surface because of the clear traces of retouching remaining thereon. In the worst case, such traces serve to cause contamination and, thus the plate is not applicable as a lithographic printing plate.

To eliminate such problems, for instance, Japanese Patent Un-examined Publication (hereinafter referred to as "J.P. KOKAI") No. 57-195697 proposes to additionally treat an anodized aluminum plate with a condensed sodium arylsulfonate. The contamination of the non-image areas can certainly be prevented according to this method, but on the contrary a new problem arises that the printing durability of the printing plate is reduced to 30 to 80% compared with that of the plate which has not subjected to the foregoing treatment.

On the other hand, Japanese Patent Publication for Opposition Purpose (hereunder referred to as "J.P. KOKOKU") No. 46-35685 proposes to treat the anodized aluminum plate with polyvinyl phosphonic acid. However, the aforesaid contamination of the non-image areas can only insufficiently be prevented when such a substrate is used.

When a conventional lithographic printing plate is used, background contamination of printed matters is caused since the ink attached to the non-image areas thereof is not rapidly removed. It can also be thought that the thickness of the anodized film may be increased to improve resistance to scracth of the non-image areas. However, in such a case, the contamination of the non-image areas becomes more and more severe and it cannot be eliminated by the aforementioned method for preventing the contamination.

As a method for preventing the contamination of the non-image areas by an electrochemical treatment, there has been known a method comprising subjecting an aluminum plate to barrier type anodization, forming a porous anodized film and then subjecting it to barrier type anodization (see J.P. KOKAI No. 53-2103).

Moreover, J.P. KOKAI No. 58-153699 discloses a method comprising forming a porous anodized film on the surface of an aluminum plate and then again anodizing it at a voltage of not more than 100 V in an oxo anion-containing electrolyte such as a boric acid solution.

However, in these methods, the barrier type anodization and re-anodization treatments are conducted at a voltage of not more than 100 V and these methods do not use a high voltage sufficient to seal pores of the porous anodized film. Therefore, the effect of preventing the contamination of the non-image areas is insufficient. In addition, if the thickness of the porous anodized film is relatively thin, the sealing of pores thereof can be achieved, but the resulting film is inferior in mechanical strength and the non-image areas are not resistant to scratching.

Moreover, it is found that if the grained surface is subjected to barrier type anodization, the printing durability of the resultant lithographic printing plate become low.

SUMMARY OF THE INVENTION

Accordingly, it is an object of the present invention to provide a substrate for PS plates which can impart excellent properties to the resultant lithographic printing plates, i.e., they sparingly cause contamination of non-image portions, they have high resistance to scratching, high wear resistance and easy recovery from ink contamination of the non-image areas and they easily achieve a balance between water and ink as well as the substrate can impart high printing durability to the resulting lithographic printing plate.

The inventors of the present invention have conducted various studies to achieve the foregoing object of the invention and have found that it is effective for eliminating the foregoing disadvantages to apply a porous anodized film to the surface of a substrate and to seal the pores thereof in a predetermined degree. As a result the present invention has been completed. Consequently, the present invention relates to a substrate for PS plates comprising an aluminum plate provided thereon with a porous anodized film, the degree of sealing of the anodized film being not less than 25%.

DETAILED EXPLANATION OF THE INVENTION

Figure 1:
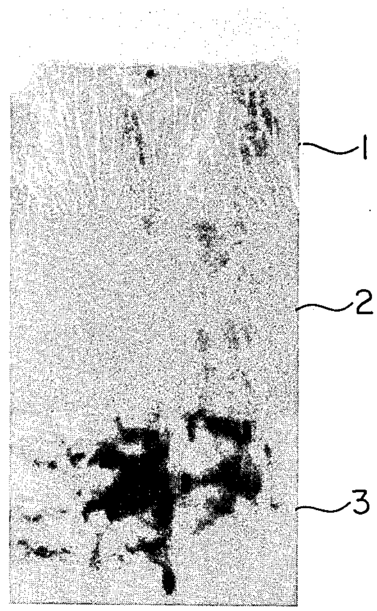
FIG. 1 is an electron microscope photograph of a cross section illustrating the metallographic structure of the substrate of the present invention.

The substrate of the present invention will hereunder be explained in more detail.

(Aluminum Plate)

Aluminum plates herein used are plates of pure aluminum or aluminum alloys containing trace amount of different elements. Examples of such different elements are silicon, iron, manganese, copper, magnesium, chromium, zinc, bismuth, nickel and titanium. The content of these different elements are in general not more than 10% by weight of the alloy. In other words, the composition of the aluminum plate is not critical and any conventional materials may be properly used in the invention. Among the aluminum substrates, preferred is a plate of pure aluminum. However, since it is difficult to obtain a completely pure aluminum plate from the viewpoint of refining technique, the aluminum plate used herein preferably contains such different elements as low as possible, in other words, aluminum plate substantially free from different elements. It is desirable to use an aluminum plate having a thickness ranging from 0.1 to 0.5 mm.

(Surface Roughening Treatment)

Prior to the anodization of an aluminum plate, the plate is optionally degreased with an aqueous solution of a surfactant or an alkali to remove rolling oil and then grained.

Examples of the graining methods include those for mechanically roughening the surface, those for electrochemically dissolving the surface and those for chemically and selectively dissolving out the surface. The mechanical surface roughening can be performed by any known method such as those referred to as ball graining, brush graining, blast graining and buff graining. The electrochemical graining may be carried out in an electrolyte such as a hydrochloric acid or nitric acid solution while applying an electric current (DC or AC). In addition, these graining techniques can be combined as disclosed in J.P. KOKAI No. 54-63902.

The aluminum plate thus surface roughened may optionally be etched with an alkali and then washed to neutralize the alkali.

(Formation of Porous Anodized Film)

Any electrolytes may be used to carry out the formation of anodized film on the surface roughened aluminum plate so far as they ensure the formation of porous anodized film. As such electrolytes, it is general to use sulfuric acid, phosphoric acid, oxalic acid, chromic acid or a mixture thereof; or a sodium hydroxide solution, a potassium hydroxide solution or a mixure thereof; or a bath to which ammonium fluoride is added. The composition of such an electrolyte may be appropriately determined in accordance with the kind of electrolytes present therein. The conditions for the formation of porous anodized film may vary depending on the kind of the electrolytes used, but in general, it is desirable that the concentration of the electrolytes ranges from 1 to 80% by weight; the temperature thereof 5° to 80° C.; the current density 5 to 80 $A/dm^2$; the voltage to be applied 1 to 100 V; and the electrolyzation time 5 seconds to 10 minutes.

The preferred amount of the porous anodized film ranges from 0.8 to 10 $g/m^2$, more preferably 1 to 6 $g/m^2$.

(Sealing Treatment)

The sealing treatment herein means a treatment for sealing pores of the porous anodized film with a metal, a metal oxide or a metal hydroxide by electrolyzing an aluminum plate provided thereon with a porous anodized film in an electrolyte or simply dipping the same therein. The electrolytes used in this treatment may contain a variety of oxo acids or a salt thereof or those containing fine particles of an inorganic substance therein. Examples of such additives are oxo acids of boron, phosphorus, vanadium, molybdenum, tungsten, sulfur, carbon and/or silicon and/or salts thereof. Among these, preferred and useful examples thereof are boric acid, phosphoric acid, sulfuric acid, vanadic acid, molybdic acid, tungstic acid, carbonic acid, carboxylic acid, silicic acid, phosphomolybdic acid, phosphotungstic acid; and/or sodium, potassium, copper, nickel, cobalt, cadmium, zinc, tin, ammonium, calcium, lithium, magnesium and/or barium salts thereof.

In addition, as the fine particles of inorganic substances to be filled in the pores of the porous anodized film there may be mentioned sols of such oxides as silica, alumina and titania; such nitrides as titanium nitride and aluminum nitride; and such silicides as carbon silicide. These particles may be formed within gas phase to thus fill the pores by methods such as sputtering, vapour deposition or ion implantation technique. Compounds other than the foregoing ones may also be used so far as they can seal the pores of the porous anodized film. Surprisingly, the sealing of the pores of the anodized film leads to increase in the hardness of the surface of the film and can impart various excellent properties to the finally obtained lithographic printing plates.

Particularly preferred is an electrolytic sealing method among others. The electrolytic sealing method can be performed by either constant current electrolysis or constant voltage electrolysis and it can be carried out by AC, DC or AC/DC electrolysis. In the constant current electrolysis, the thickness of sealing increases with time and the voltage correspondingly increases. Therefore, the sealing thickness is proportional to the voltage immediately before the completion of the electrolysis.

In the constant voltage electrolysis, a large amount of current proportional to the voltage applied is initially observed and the current gradually decreases with time. When the electrolysis is performed until the current becomes almost zero, the thickness of sealing is proportional to the electrolysis voltage. Thus, in the electrolytic sealing treatment, the thickness of sealing may be controlled by adjusting the magnitude of the voltage to be applied.

Figure 2:
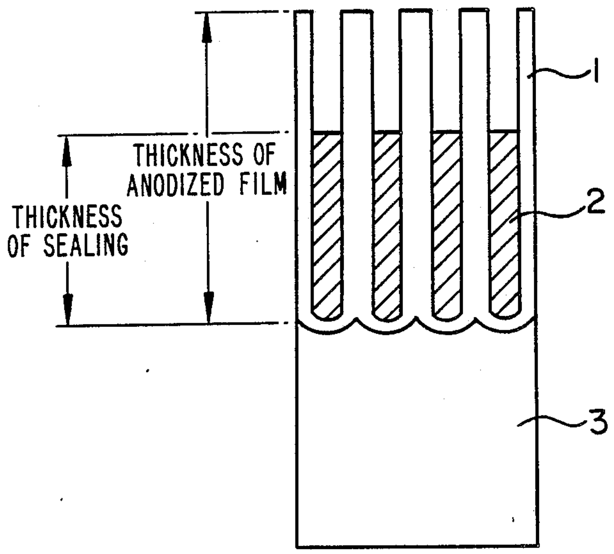
FIG. 2 is a schematic diagram illustrating the metallographic structure of the substrate of the invention shown in FIG. 1.

FIG. 1 is an electron microscope photograph of the sectional view of a substrate, porous anodized film of which has been subjected to electrolytic sealing treatment, illustrating the metallographic view of the anodized film. FIG. 2 is a schematic diagram of the metallograph of the anodized film shown in FIG. 1. In FIGS. 1 and 2, the reference numeral 1 denotes a porous anodized film, 2 a porous anodized film which has been subjected to electrolytic sealing treatment, and 3 an aluminum substrate. Either of FIGS. 1 and 2 shows that pores of the porous anodized film 1 are filled up with the electrolytic sealed anodized film 2.

In this respect, the degree of sealing can be defined as follows:

$$\text{Degree of Sealing} = \frac{\text{Thickness of Sealing}}{\text{Thickness of the Film}} \times 100$$

In other word, the degree of sealing herein means the ratio of the thickness of sealing (the depth of the pore filled with such substances by the sealing treatment) to the whole thickness of the anodized film (the thickness of the anodized film) which is multiplied by 100. The thickness of sealing and the whole thickness of the anodized film can be determined by the electron microscopic observation and, therefore, the degree of sealing can unequivocally be obtained. In the present invention, the degree of sealing is 25% or more. If it is less than 25%, background contamination easily arises.

(Hydrophilic Layer)

The surface of the aluminum plate thus sealed may be subjected to the following hydrophilic treatment. That is the substrate of the present invention may be provided with a hydrophilic layer as disclosed in J.P. KOKAI Nos. 60-149491, 60-232998 and 62-19494.

The substrate of the present invention may be treated with an aqueous solution of an alkali metal silicate such as sodium silicate as disclosed in U.S. Pat. No. 3,181,461, before or after the application of such a hydrophilic layer.

(Light-sensitive Layer)

A conventionally known light-sensitive layer may be applied to the surface of the substrate thus obtained to form a PS plate. The lithographic printing plate obtained by subjecting the same to plate making treatment has excellent properties.

The composition for preparing such a light-sensitive layer is not restricted to specific ones so far as they cause change in their solubility or swellinq properties before and after exposing the layer to light. Typical examples thereof will hereunder be explained.

(i) Light-sensitive Compositions Comprising o-Quinonediazide Compounds

Most preferred examples of positive-working light-sensitive diazo compounds are an ester of benzoquinone-1,2-diazidosulfonic acid chloride and a polyhyiroxyphenyl and an ester of naphthoquinone-1,2-diazidosulfonic acid chloride and a pyrogallol-acetone resin as disclosed in J.P. KOKOKU No. 43-28403. Other relatively preferred o-quinonediazide compounds are, for instance, esters of benzoquinone-1,2-diazidosulfonic acid chloride or naphthoquinone-1,2-diazidosulfonic acid chloride and a phenol-formaldehyde resin as disclosed in U.S. Pat. Nos. 3,046,120 and 3,188,210.

These o-quinonediazide compounds may independently constitute a light-sensitive layer, but they may be combined with an akaline water-soluble resin as a binder. Examples of such an alkaline water-soluble resins include such novolak resins as phenol-formaldehyde resin, cresol-formaldehyde resin, p-t-butylphenol/formaldehyde resin, phenol-modified xylene resin and phenol-modified xylene/mesitylene resin. Other examples of useful alkaline water-soluble resins are polyhydroxystyrene, and copolymers of polyhalogenated hydroxystyrene-modified (meth)acrylic acid with other vinylic monomer(s).

The light-sensitive layer composed of o-quinonediazide compounds and developers therefor are detailed in U.S. Pat. No. 4,259,434.

(ii) Light-sensitive Compositions Composed of Diazo Resins and Binders

Preferred examples of negative-working light-sensitive diazo compounds useful in the invention are such a reaction product of a diazonium salt with an organic condensation agent having reactive carbonyl groups, e.g., aldol or acetal as a condensation product of diphenylamine-p-diazonium salt and formaldehyde (so-called light-sensitive diazo resins) disclosed in U.S. Pat. Nos. 2,063,631 and 2,667,415. Examples of other useful condensed diazo compounds are such as those disclosed in U.S. Pat. No. 3,679,419 and U.K. Patent Nos. 1,312,925 and 1,312,926. The light-sensitive diazo compounds of this type are in general available in the form of water-soluble inorganic salts and, therefore, they can be applied as an aqueous solution. Alternatively, it is also possible to use substantially water-insoluble light-sensitive diazo resins obtained by reacting these water soluble diazo compounds with aromatic or aliphatic compounds having either one or both of at least one phenolic hydroxyl group and sulfonic acid group in the manner as disclosed in U.K. Patent No. 1,280,885.

In addition, they may be used as a reaction products with hexafluorophosphates or tetrafluoroborates as disclosed in J.P. KOKAI No. 56-121031. Besides, diazo resins as disclosed in U.K. Patent No. 1,312,925 are also preferred in the present invention.

Such a diazo resin is used in combination with a binder. Preferred binders are organic polymers having an acid value of 10 to 200, specific examples of which are copolymers comprising, as an essential component, acrylic acid, methacrylic acid, crotonic acid or maleic acid such as terpolymers or quaternary polymers of 2-hydroxyethyl (meth)acrylate, (meth)acrylonitrile, (meth)acrylic acid and an optional other copolymerizable monomer as disclosed in U.S. Pat. No. 4,123,276; copolymers of (meth)acrylic acid which has a hydroxyl group at the terminus and is esterified with a group carrying dicarboxylic acid ester residues, (meth)acrylic acid and an optional other copolymerizable monomer as disclosed in J.P. KOKAI No. 53-120903; copolymers of a monomer having, at the terminus, an aromatic hydroxyl group such as N-(4-hydroxyphenyl)-methacrylamide, (meth)acrylic acid and at least one optional other copolymerizable monomer as disclosed in J.P. KOKAI No. 54-98614; and copolymers of alkyl (meth)acrylate, (meth)acrylonitrile and an unsaturated carboxylic acid as disclosed in J.P. KOKAI No. 56-4144. In addition, acidic polyvinyl alcohol derivatives and acidic cellulose derivatives are also useful in the invention.

Other preferred examples thereof include polyvinyl butyral resins having carboxylic acid groups as disclosed in J.P. KOKAI Nos. 60-182437 and 61-281236; and polyurethane resins having carboxyl groups as disclosed in U.K. Patent Laid Open Applicaion No. 2,185,120.

(iii) Çompositions Composed of Polymeric Compounds Having Groups: —CH═CH—CO— on the Main Chain or Side Chains Examples of such compositions include those mainly composed of polyesters, polyamides and polycarbonates having, as the light-sensitive groups, —CH═CH—CO— on the main chain or side chains as disclosed in U.S. Pat. Nos. 3,030,208; 3,707,373 and 3,453,237; those mainly composed of light-sensitive polyesters derived from (2-propenylidene)malonic acid (e.g., cinnamylidene malonic acid) and bifunctional glycols such light-sensitive polymers as disclosed in U.S. Pat. Nos. 2,956,878 and 3,173,787; and cinnamates of hydroxyl group-containing polymers such as polyvinyl alcohols, starches and homologues thereof, for instance, light-sensitive polymers as disclosed in U.S. Pat. Nos. 2,690,966; 2,752,372 and 2,732,301. These compositions may further comprise other additives such as sensitizing agents, stabilization agents, plasticizers, pigments and/or dyes.

(iv) So-called Copolymerizable Compositions Capable of Being Copolymerized by Irradiating with Actinic Rays Examples thereof are those composed of addition polymerizable unsaturated compounds having at least two terminal ethylene groups and a photopolymerization initiator as disclosed in U.S. Pat. Nos. 2,760,863 and 3,060,023.

The so-called copolymerizable compositions capable of being dimerized or polymerized by irradiating with actinic rays may further contain other additives such as resins as binders, sensitizing agents, heat polymerization inhibitors, dyes and/or plasticizers.

The aforementioned light-sensitive compositions are usualy applied to the surface of the substrate of the invention in the form of a solution in water, organic solvents or a mixture thereof and then are dried to form PS plates.

The amount of the light-sensitive composition to be applied to the substrate in general ranges from about 0.1 to about 5.0 g/m$^2$ and preferably about 0.5 to about 3.0 g/m$^2$ after drying.

The PS plate thus prepared is imagewise exposed to light including actinic rays derived from a light source such as a carbon arc lamp, a xenon lamp, a mercury lamp, a tungsten lamp or a metal halide lamp and then is developed to obtain a lithographic printing plate.

A lithographic printing plate which is obtained by imagewise exposing to light the PS plate prepared utilizing the substrate of this invention and then developing the same, regardless of whether it is positive-working or negative-working type one, have excellent properties, for instance, it never shows contamination of non-image areas, the differentiation between the non-image and image areas thereof is quite easy during the retouching process and it causes no traces of retouching. Therefore, the background contamination of printed matters because of the traces of retouching is not caused, the non-image areas are not easily scratched and the lithographic printing plate as the final product, is excellent in wear resistance and printing durability. Moreover, it has high recovery from the ink contamination. In addition, the light-sensitive layer does not remain on the plate after the development and, thus the balance between water and ink can easily be achieved.

The present invention will hereunder be described in more specifically with reference to the following non-limitative working Examples. In addition, the effects practically attained by the present invention will also be discussed below in detail in comparison with Comparative Examples. In the following Examples, the term "%" represents "% by weight" unless otherwise specified.

Examples 1 to 16 and Comparative Examples 1 to 23

An aluminum sheet JIS 1050 was grained with a rotary nylon brush and an aqueous suspension of pumice as a grinding material. At this stage, the surface roughness (center line average height) was 0.5 micron. After washing with water, the sheet was immerzed in 10% aqueous caustic soda solution heated to 70° C. to etch it so that the amount of aluminum dissolved out reached 6 g/m$^2$. The sheet was washed with water, neutralized by dipping it in 30% aqueous nitric acid solution and then sufficiently washed with water. Thereafter, it was subjected to electrolytic surface roughening treatment for 20 seconds in 0.7% aqueous nitric acid solution utilizing rectangular alternating wave of 13 V of anodic voltage and 6 V of cathodic voltage (power supply waveshape disclosed in Example of J.P. KOKAI No. 52-77702), was immersed in 20% sulfuric acid solution of 50° C. to wash the surface thereof and then washed with water.

In addition, a porous anodized film was formed on the sheet by passing a direct current through 20% aqueous solution of sulfuric acid in which the sheet was immersed. Several substrates differing in the weight of the anodized films were prepared by changing the electrolysis time.

Then the sheet was electrolytically sealed by passing an electric current of 0.1 A/dm$^2$ in 4% ammonium borate of 30° C. to obtain substrates. The thickness of sealing was controlled by adjusting processing time.

The degree of sealing of the substrates thus produced was determined and then the light-sensitive solution having the following composition was applied to the surface of the substrate so that the coated amount thereof weighed after drying was 2.5 g/m$^2$ to form a light-sensitive layer thereon.

| Component | Amount (g) |
|---|---|
| Ester of naphthoquinone-1,2-diazido-5-sulfonyl chloride and pyrogallol/acetone resin (see Example 1 of U.S. Pat. No. 3,635,709) | 0.75 |
| Cresol/novolak resin | 2.00 |
| Oil Blue #603 (available from ORIENT CHEMICAL CO., LTD.) | 0.04 |
| Ethylene dichloride | 16 |
| 2-Methoxyethyl acetate | 12 |

The PS plate thus obtained was exposed to light, for 50 seconds, from a metal halide lamp of 3 KW at the distance of 1 m through a transparent positive film in a vacuum printing frame and then was developed with 5.26% aqueous solution of sodium silicate (pH 12.7) whose molar ratio $SiO_2/Na_2O$ was 1.74. Then, the plate was sufficiently washed with water, and contamination of the non-image areas and wear resistance of the image areas were determined. The results obtained are listed in Table I.

Example 9' and Comparative Example 18'

The substrates of Example 9 and Comparative Example 18 were washed by immersing in 2.5% solution of No. 3 sodium silicate maintained at 10° C. for 30 seconds and were dried and then the light-sensitive solution having the following composition was applied thereto and dried to form a light-sensitive layer. The coated amount of the light-sensitive layer was 2.0 g/m$^2$ (weighed after drying).

| Component | Amount (g) |
|---|---|
| N-(4-Hydroxyphenyl)-methacrylamide/2-hydroxy-ethylmethacrylate/acrylonitrile/methyl methacrylate/methacrylic acid (15:10:30:38:7 molar ratio) copolymer (average molecular weight = 60,000) | 5.0 |
| Hexafluorophosphate of the condensate of 4-diazo-diphenylamine and formaldehyde | 0.5 |
| Phophorous Acid | 0.05 |
| Victoria Pure Blue BOH (available from HADOGAYA CHEMICAL CO., LTD.) | 0.1 |
| 2-Methoxyethanol | 100 |

The PS plate thus obtained was exposed to light, for 50 seconds, from a metal halide lamp of 3 KW at the distance of 1 m through a transparent negative film in a vacuum printing frame, then was developed with the developer having the following composition and was gummed up with an aqueous solution of gum arabic to obtain a lithographic printing plate.

(Developer)

| Component | Amount (g) |
|---|---|
| Sodium sulfite | 5 |
| Benzylalcohol | 30 |
| Sodium carbonate | 5 |
| Sodium isopropylnaphthalene sulfonate | 12 |
| Pure water | 1000 |

Contamination and wear resistance of the non-image areas were likewise determined as in Experiment Nos. 1 to 39 and the results obtained were listed in Table II.

Comparative Example 24

The substrate of Comparative Example 18 was immersed in pure water of 100° C. for 2 minutes to seal the pores of the anodized film, followed by applying a light-sensitive layer, exposing it to light, developing the same and finally determining contamination and wear resistance of the non-gummed up and printing peration was performed. the results observed are summarized in Table III. Observing pores of the anodized film by an electron microscope, only the upper portions of the pores were sealed and the middle and the lower portions thereof were not sealed.

Example 12′

The PS plate of Example 12 was exposed to light and developed and contamination and wear resistance of the non-image areas of the resulting plate were examined. Thereafter, the plate was gummed up and the printing opearration was carried out as in Experiment Nos. 1 to 39. The results obtained are summarized in Table III.

As seen from the results listed in the following Tables, the lithographic. printing plate which can be obtained by exposing to light and developing the PS plate produced by using the substrate of the present invention, regardless of whether it is positive-working or negative-working type one, shows no contamination of the non-image areas, has high wear resistance and exhibits high resistance to contamination of non-image areas compared with lithographic printing plates using substrates obtained by a conventional sealing method in which compressed vapor or boiling water is used.

TABLE I

| Ex. No. | Amount of AD (g/sq.m) | Degree of Sealing (%) | Wear R. (note 1) | Cont. of N.I.A. (note 2) | Substrate |
|---|---|---|---|---|---|
| 1 | 0 | — | C | A | Comp. Ex. 1 |
| 2 | 0.3 | 0 | C | A | Comp. Ex. 2 |
| 3 | 0.3 | 25 | C | A | Comp. Ex. 3 |
| 4 | 0.3 | 100 | C | A | Comp. Ex. 4 |
| 5 | 0.7 | 0 | C | A | Comp. Ex. 5 |
| 6 | 0.7 | 10 | C | A | Comp. Ex. 6 |
| 7 | 0.7 | 20 | C | A | Comp. Ex. 7 |
| 8 | 0.7 | 25 | C | A | Comp. Ex. 8 |
| 9 | 0.7 | 30 | C | A | Comp. Ex. 9 |
| 10 | 0.7 | 50 | C | A | Comp. Ex. 10 |
| 11 | 0.7 | 100 | B | A | Comp. Ex. 11 |
| 12 | 1.0 | 0 | B | A | Comp. Ex. 12 |
| 13 | 1.0 | 10 | B | A | Comp. Ex. 13 |
| 14 | 1.0 | 20 | B | A | Comp. Ex. 14 |
| 15 | 1.0 | 25 | A | A | Ex. 1 |
| 16 | 1.0 | 30 | A | A | Ex. 2 |
| 17 | 1.0 | 50 | A | A | Ex. 3 |
| 18 | 1.0 | 100 | A | A | Ex. 4 |
| 19 | 1.3 | 0 | B | A | Comp. Ex. 15 |
| 20 | 1.3 | 10 | B | A | Comp. Ex. 16 |
| 21 | 1.3 | 20 | B | A | Comp. Ex. 17 |
| 22 | 1.3 | 25 | A | A | Ex. 5 |
| 23 | 1.3 | 30 | A | A | Ex. 6 |
| 24 | 1.3 | 50 | A | A | Ex. 7 |
| 25 | 1.3 | 100 | A | A | Ex. 8 |
| 26 | 1.8 | 0 | B | B | Comp. Ex. 18 |
| 27 | 1.8 | 10 | B | B | Comp. Ex. 19 |
| 28 | 1.8 | 20 | A | B | Comp. Ex. 20 |
| 29 | 1.8 | 25 | A | A | Ex. 9 |
| 30 | 1.8 | 30 | A | A | Ex. 10 |
| 31 | 1.8 | 50 | A | A | Ex. 11 |
| 32 | 1.8 | 100 | A | A | Ex. 12 |
| 33 | 2.5 | 0 | A | C | Comp. Ex. 21 |
| 34 | 2.5 | 10 | A | C | Comp. Ex. 22 |
| 35 | 2.5 | 20 | A | B | Comp. Ex. 23 |
| 36 | 2.5 | 25 | A | A | Ex. 13 |
| 37 | 2.5 | 30 | A | A | Ex. 14 |
| 38 | 2.5 | 50 | A | A | Ex. 15 |
| 39 | 2.5 | 100 | A | A | Ex. 16 |

TABLE II

| Ex. No. | Amount of AD (g/sq.m) | Degree of Sealing (%) | Wear R. (note 1) | Cont. of N.I.A. (note 2) | Substrate |
|---|---|---|---|---|---|
| 40 | 1.8 | 0 | B | B | Comp. Ex. 18′ |
| 41 | 1.8 | 25 | A | A | Ex. 9′ |

TABLE III

| Ex. No. | Amount of AD (g/sq.m) | Method of Sealing | Wear R. (note 1) | Cont. of N.I.A. (note 2) | Substrate |
|---|---|---|---|---|---|
| 42 | 1.8 | sealing by boiling pure water | A | B | Comp. Ex. 24 |
| 43 | 1.8 | electrolytic sealing (degree of sealing = | A | A | Ex. 12′ |

TABLE III-continued

| Ex. No. | Amount of AD (g/sq.m) | Method of Sealing | Wear R. (note 1) | Cont. of N.I.A. (note 2) | Substrate |
|---|---|---|---|---|---|
| | | 100%) | | | |

Note 1: Wear resistance (wear R.) was estimated by observing the non-image areas after moving an alumina abrasive paper on the non-image area back and forth for 350 times, using an abrasion tester NUS-ISO-1 type; available from SUGA TESTING MACHINE CO., LTD.) on the basis of the following criteria:
A - The surface of the non-image area is not almost warn out;
B - It is worn out ion some degre;
C - It is substantially worn out.
Note 2: Contamination of non-image areas (Cont. of N.I.A.) was estimated by using the difference in reflective optical density f(ΔD) between the non-image areas and the surface of the substrate immediately before the application of the light-sensitive layer on the basis of the following criteria:
A - not more than 0.02
B - more than 0.02 and not more than 0.05
C - more than 0.05

What is claimed is:

1. A substrate for presensitized plates for use in making lithographic printing plates comprising an aluminum plate provided thereon with a porous anodized film, wherein the degree of sealing of the anodized film is not less than 25%, and the amount of the porous anodized film is 0.8g/m$^2$ or more.

2. A substrate of claim 1 wherein the thickness of the aluminium plate ranges from 0.1 to 0.5 mm.

3. A substrate of claim 1 wherein the aluminum plate is substantially comprised of pure aluminum.

4. A substrate of claim 1 wherein the porous anodized film is formed by electrolyzing the aluminum plate in an electrolyte having a concentration of 1 to 80% by weight, at a temperature of 5° to 80° C., a current density of 5 to 80 A/dm$^2$ and a voltage of 1 to 100 V for 5 seconds to 10 minutes.

5. A substrate of claim 1 wherein the surface of the aluminum plate is grained prior to the anodization.

6. A substrate of claim 1 wherein the aluminum plate is a pure aluminum plate or a plate of an aluminum allloy containing different elements in a trace amount.

7. A substrate of claim 6 wherein the amount of the different elements in the aluminum alloy is not more than 10% by weight of the alloy.

8. A substrate of claim 6 wherein the different elements are selected from the group consisting of silicon, iron, manganese, copper, magnesium, chromium, zinc, bismuth, nickel and titanium.

9. A substrate of claim 1 wherein the pores of the anodized film are sealed by electrolytic sealing, sputtering, vapour deposition or ion implantation technique.

10. A substrate of claim 9 wherein the pores of the anodized film are sealed by electrolytic sealing technique.

11. A substrate of claim 10 wherein the degree of sealing of the anodized film is controlled by adjusting voltage applied during the electrolytic sealing.

12. A substrate of claim 10 wherein the electrolytic sealing is carried out in an electrolyte selected from the group consisting of oxo acids, salts of these acids or a mixture of these acids and/or salts and fine particles of inorganic substances.

13. A substrate of claim 12 wherein the electrolyte is selected from the group consisting of boric acid, phosphoric acid, sulfuric acid, vanadic acid, molybdic acid, tungstic acid, carbonic acid, carboxylic acid, silicic acid, phosphomolybdic acid, phosphotungstic acid; and sodium, potassium, copper, nickel, cobalt, cadmium, zinc, tin, ammonium, calcium, lithium, magnesium and barium salts thereof.

14. A substrate of claim 12 wherein the fine particles of the inorganic substances are selected from the group consisting of silica, alumina, titania, titanium nitride, aluminum nitride and carbon silicide.

15. A substrate of claim 1 wherein the amount of the porous anodized film ranges from 0.8 to 10g/m$^2$.

16. A substrate of claim 15 wherein the amount of the porous anodized film ranges from 1 to 6 g/M$^2$.

17. A substrate of claim 1 wherein the aluminum plate whose porous anodized film is sealed is subjected to hydrophilization treatment.

18. A substrate of claim 17 wherein the aluminum plate is treated with an aqueous solution of an alkali metal silicate before or after the hydrophilization treatment.

* * * * *